United States Patent
Angus et al.

(10) Patent No.: US 9,916,701 B2
(45) Date of Patent: Mar. 13, 2018

(54) VEHICLE AUDITING AND CONTROL OF MAINTENANCE AND DIAGNOSIS FOR VEHICLE SYSTEMS

(71) Applicant: The Boeing Company, Chicago, IL (US)

(72) Inventors: Ian Gareth Angus, Mercer Island, WA (US); Olga C. Walker, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 190 days.

(21) Appl. No.: 14/482,892

(22) Filed: Sep. 10, 2014

(65) Prior Publication Data

US 2016/0071331 A1    Mar. 10, 2016

(51) Int. Cl.
| | | |
|---|---|---|
| G07C 3/00 | (2006.01) | |
| G07C 5/08 | (2006.01) | |
| G06Q 10/06 | (2012.01) | |
| G06Q 10/00 | (2012.01) | |
| G07C 5/00 | (2006.01) | |

(52) U.S. Cl.
CPC ....... *G07C 5/0808* (2013.01); *G06Q 10/0631* (2013.01); *G06Q 10/20* (2013.01); *G07C 5/006* (2013.01)

(58) Field of Classification Search
None
See application file for complete search history.

(56) References Cited

U.S. PATENT DOCUMENTS

| | | | | |
|---|---|---|---|---|
| 6,067,486 A | * | 5/2000 | Aragones | G06Q 10/06 340/500 |
| 6,519,552 B1 | * | 2/2003 | Sampath | G05B 23/0254 702/183 |
| 6,816,762 B2 | * | 11/2004 | Hensey | H04L 63/0853 701/32.6 |
| 6,885,921 B1 | * | 4/2005 | Farmer | G06Q 10/06 340/945 |
| 7,761,200 B2 | * | 7/2010 | Avery | G06Q 10/06 701/29.3 |
| 7,761,201 B2 | * | 7/2010 | Avery | G07C 5/085 701/29.3 |
| 7,822,985 B2 | * | 10/2010 | Anstey | H04L 63/10 713/175 |
| 7,835,734 B2 | * | 11/2010 | Eckert | H04B 7/18506 340/945 |
| 7,984,146 B2 | * | 7/2011 | Rozak | G06Q 10/06 701/29.3 |

(Continued)

FOREIGN PATENT DOCUMENTS

EP    2521087 A1    11/2012

OTHER PUBLICATIONS http://www.vlog.aero/aircraft-digital-logbook/demo/.*

(Continued)

*Primary Examiner* — Jonathan M Dager
(74) *Attorney, Agent, or Firm* — Yee & Associates, P.C.

(57) ABSTRACT

A method and apparatus of performing a task on a system on a platform. A task script is received by a data processing system on the platform. The task script identifies task steps for performing the task on the system. The task script is run by the data processing system to perform the task on the system.

19 Claims, 7 Drawing Sheets

(56) References Cited

U.S. PATENT DOCUMENTS

| | | | | |
|---|---|---|---|---|
| 8,082,277 B1* | 12/2011 | O'Brien | G06Q 10/101 | 707/758 |
| 8,185,609 B2* | 5/2012 | Fuchs | G06F 8/61 | 709/218 |
| 8,195,535 B2* | 6/2012 | Nagalla | G06Q 10/06 | 340/958 |
| 8,271,709 B2* | 9/2012 | Rittmueller | G06F 13/4295 | 710/106 |
| 8,341,413 B2* | 12/2012 | Belmonte | H04L 63/123 | 705/67 |
| 8,589,020 B1* | 11/2013 | Angus | G06F 11/3006 | 701/29.1 |
| 8,640,228 B2* | 1/2014 | Croize | G06F 21/34 | 726/20 |
| 8,732,233 B2* | 5/2014 | Allen | G08G 5/0021 | 701/14 |
| 8,806,579 B1* | 8/2014 | Angus | G06F 21/6218 | 701/29.1 |
| 8,812,284 B2* | 8/2014 | Damiani | G06F 8/30 | 703/13 |
| 8,825,276 B2* | 9/2014 | Lake | G07C 5/0808 | 701/31.6 |
| 8,849,690 B1* | 9/2014 | Yang | G06Q 10/063116 | 705/7.16 |
| 8,880,278 B2* | 11/2014 | Ric | B64F 5/0045 | 701/29.1 |
| 8,930,068 B1* | 1/2015 | Helder | B64F 5/40 | 701/29.1 |
| 9,336,248 B2* | 5/2016 | Li | G06F 17/30303 | |
| 9,507,982 B2* | 11/2016 | Mylaraswamy | G07C 5/008 | |
| 2001/0032110 A1* | 10/2001 | Sinex | G06Q 10/025 | 701/29.4 |
| 2002/0165647 A1* | 11/2002 | Glenn, III | G06F 9/4443 | 701/3 |
| 2003/0109973 A1* | 6/2003 | Hensey | H04L 63/0853 | 701/32.6 |
| 2005/0055239 A1* | 3/2005 | Farmer | G06Q 10/06 | 705/7.11 |
| 2005/0240555 A1* | 10/2005 | Wilde | G06F 17/2247 | |
| 2006/0164261 A1* | 7/2006 | Stiffler | G01C 23/00 | 340/945 |
| 2007/0010923 A1* | 1/2007 | Rouyre | G05B 23/0267 | 701/31.4 |
| 2007/0112486 A1* | 5/2007 | Avery | G06Q 10/06 | 701/33.4 |
| 2007/0112576 A1* | 5/2007 | Avery | G06Q 10/06393 | 705/7.39 |
| 2008/0005617 A1* | 1/2008 | Maggiore | G07C 5/006 | 714/30 |
| 2008/0046962 A1* | 2/2008 | Yukawa | H04L 63/08 | 726/1 |
| 2008/0159158 A1* | 7/2008 | Poisson | G06Q 10/06 | 370/249 |
| 2009/0006169 A1* | 1/2009 | Wetzer | G06Q 10/0631 | 705/7.14 |
| 2009/0112569 A1* | 4/2009 | Angus | H04L 67/12 | 703/22 |
| 2009/0119657 A1* | 5/2009 | Link, II | G06F 8/64 | 717/171 |
| 2009/0132111 A1* | 5/2009 | Macchia | G06Q 10/06 | 701/31.4 |
| 2009/0138517 A1* | 5/2009 | McLain | G06F 21/51 | |
| 2009/0138871 A1* | 5/2009 | Kimberly | G06F 8/61 | 717/173 |
| 2009/0138874 A1* | 5/2009 | Beck | G06F 8/61 | 717/173 |
| 2009/0150022 A1* | 6/2009 | McMillin | G06Q 10/06 | 701/33.4 |
| 2009/0157532 A1* | 6/2009 | Shiner | G06Q 10/087 | 705/28 |
| 2009/0187449 A1* | 7/2009 | van Tulder | G06Q 10/06 | 705/7.17 |
| 2009/0192659 A1* | 7/2009 | Beebe | G06F 11/0739 | 701/2 |
| 2009/0198392 A1* | 8/2009 | Eicke | G01C 23/005 | 701/3 |
| 2009/0198393 A1* | 8/2009 | Sims, III | G06F 8/61 | 701/3 |
| 2009/0243854 A1* | 10/2009 | Scheid | G06Q 10/06 | 340/572.1 |
| 2009/0254403 A1* | 10/2009 | Nagalla | G06Q 10/06 | 705/7.38 |
| 2009/0265357 A1* | 10/2009 | Yukawa | G06F 17/30 | |
| 2009/0265393 A1* | 10/2009 | Yukawa | G06F 17/30575 | |
| 2010/0063754 A1* | 3/2010 | Thomas | G01R 31/086 | 702/59 |
| 2010/0100887 A1* | 4/2010 | Beltrand | G06F 11/1438 | 718/104 |
| 2010/0121520 A1* | 5/2010 | Yukawa | G06F 11/0739 | 701/31.4 |
| 2010/0121938 A1* | 5/2010 | Saugnac | G07C 5/008 | 709/218 |
| 2010/0125379 A1* | 5/2010 | Fournier | G06Q 10/06 | 701/3 |
| 2010/0131149 A1* | 5/2010 | Saugnac | G07C 5/008 | 701/31.4 |
| 2010/0211358 A1* | 8/2010 | Kesler | G07C 9/00111 | 702/184 |
| 2010/0312420 A1* | 12/2010 | Sham | G06Q 10/00 | 701/3 |
| 2011/0040442 A1* | 2/2011 | Koepping | G07C 5/0808 | 701/31.4 |
| 2011/0202924 A1* | 8/2011 | Banguero | G06F 9/485 | 718/103 |
| 2011/0288759 A1* | 11/2011 | Saugnac | G06Q 10/06 | 701/120 |
| 2012/0143436 A1* | 6/2012 | Cornet | G07C 5/085 | 701/33.4 |
| 2013/0031543 A1* | 1/2013 | Angus | G06F 9/45558 | 718/1 |
| 2013/0036103 A1* | 2/2013 | Lawson | G06F 21/64 | 707/698 |
| 2013/0067450 A1* | 3/2013 | Saugnac | G06F 8/65 | 717/170 |
| 2013/0166458 A1* | 6/2013 | Wallner | G06Q 10/20 | 705/305 |
| 2013/0198358 A1* | 8/2013 | Taylor | H04L 41/0213 | 709/223 |
| 2013/0204469 A1* | 8/2013 | Horsager | G01F 9/008 | 701/3 |
| 2013/0304307 A1* | 11/2013 | Safa-Bakhsh | G07C 5/006 | 701/31.4 |
| 2013/0305391 A1* | 11/2013 | Haukom | G06F 21/84 | 726/29 |
| 2013/0335197 A1* | 12/2013 | Oder | G06K 7/0008 | 340/10.1 |
| 2014/0067694 A1* | 3/2014 | Moos | G06Q 10/20 | 705/305 |
| 2014/0122023 A1* | 5/2014 | Dewangan | G06Q 10/06 | 702/182 |
| 2014/0258257 A1* | 9/2014 | Schowalter | G06F 8/61 | 707/705 |
| 2014/0337616 A1* | 11/2014 | Kimberly | G06F 21/57 | 713/156 |
| 2014/0337630 A1* | 11/2014 | Kimberly | H04L 9/3281 | 713/176 |
| 2015/0019862 A1* | 1/2015 | Uczekaj | H04L 67/12 | 713/155 |
| 2015/0269787 A1* | 9/2015 | Kumar | G07C 5/00 | 701/29.1 |
| 2015/0269790 A1* | 9/2015 | Batcheller | G08G 1/20 | 701/537 |
| 2015/0356319 A1* | 12/2015 | Kimberly | G06F 21/51 | 726/1 |

(56) References Cited

U.S. PATENT DOCUMENTS

2016/0075443 A1* 3/2016 Schmutz .............. G08G 5/0013
                                                701/14
2016/0086389 A1* 3/2016 Mylaraswamy ....... G07C 5/006
                                                704/257
2016/0092192 A1* 3/2016 Frayssignes .............. G06F 8/61
                                                717/174

OTHER PUBLICATIONS

Technical order 00-20-1, regarding USAF aircraft mainenance procedures, Apr. 30, 2003.*
Kumar et al., "Vehicle Maintenance Using Identification Tags and Onboard Data Processing System," U.S. Appl. No. 14/223,496, filed Mar. 24, 2014, 57 pages.
Extended European Search Report, dated Dec. 23, 2015, regarding Application No. EP15179881.6, 9 pages.

* cited by examiner

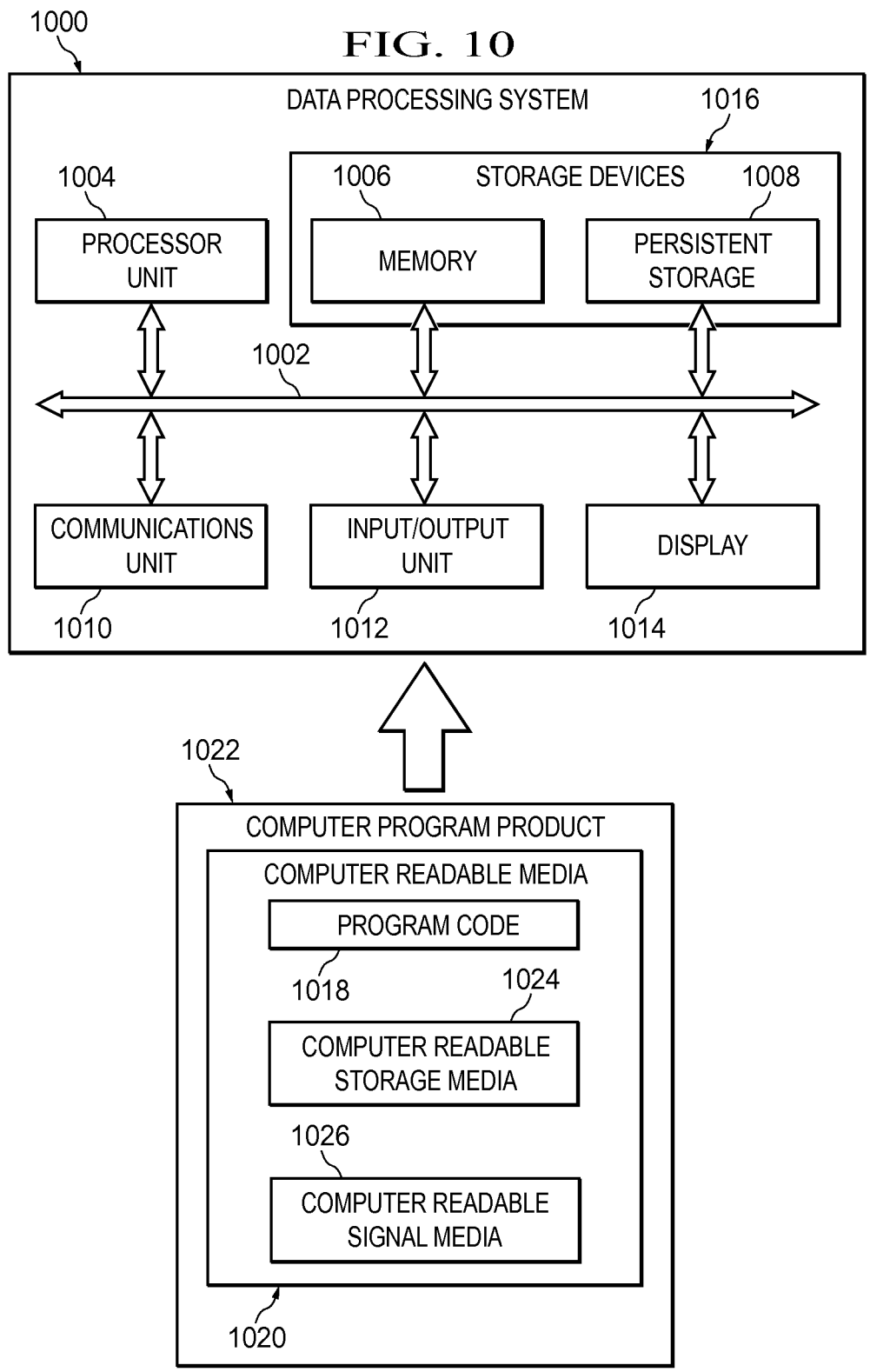

VEHICLE AUDITING AND CONTROL OF MAINTENANCE AND DIAGNOSIS FOR VEHICLE SYSTEMS

BACKGROUND INFORMATION

1. Field

The present disclosure relates generally to aircraft and other vehicles and, in particular, to the maintenance and diagnosis of electronic and other systems on an aircraft or other vehicle. Still more particularly, the present disclosure relates to a method and apparatus for auditing or controlling the maintenance or diagnosis of systems on an aircraft or other vehicle by the aircraft or other vehicle itself.

2. Background

Modern aircraft are extremely complex. For example, an aircraft may have many types of electronic and other systems on board. An electronic system on an aircraft may be a line-replaceable unit (LRU). A line-replaceable unit is designed to be easily replaceable.

An electronic system may take on various forms. An electronic system on an aircraft may be, for example, without limitation, a flight management system, an autopilot, an in-flight entertainment system, a communications system, a navigation system, a flight controller, a flight recorder, and a collision avoidance system. The various electronic systems on an aircraft may communicate with each other via digital networks on the aircraft.

Aircraft operators are entities that operate aircraft. Examples of aircraft operators include airlines and military units. Aircraft operators may be responsible for the maintenance of aircraft. Maintenance of an aircraft may include performing various maintenance tasks on the electronic and other systems on the aircraft. For example, without limitation, maintenance tasks may include reworking or replacing systems or parts of systems on the aircraft. Maintenance of an aircraft also may include performing various diagnostic tasks. For example, without limitation, diagnostic tasks may be performed to determine the condition of systems on the aircraft, to determine appropriate maintenance operations to perform on the systems, or for another appropriate purpose or various combinations of purposes. Maintenance and diagnostic tasks may be performed on the systems on an aircraft by appropriate maintenance personnel or other personnel using appropriate maintenance devices or other appropriate tools.

Instructions for performing maintenance on an aircraft may be received by maintenance personnel from an aircraft operator or other appropriate entity. For example, without limitation, the instructions may identify various diagnostic tasks, maintenance tasks, or both diagnostic tasks and maintenance tasks to be performed on the aircraft. The instructions may be provided to the maintenance personnel on paper, electronically, or both on paper and electronically.

Maintenance personnel may perform maintenance on the aircraft as indicated in the instructions received from the aircraft operator or other entity. Maintenance personnel may refer to a maintenance manual or other appropriate documentation to perform the maintenance on the aircraft as indicated in the instructions. For example, without limitation, the maintenance manual or other documentation may identify specific procedures for performing maintenance tasks, diagnostic tasks, or both maintenance tasks and diagnostic tasks indicated in the instructions provided to the maintenance personnel. The maintenance manual or other documentation used by the maintenance personnel to perform maintenance on an aircraft may be provided on paper, electronically, or both on paper and electronically, by a manufacturer of the aircraft or other appropriate entity.

An aircraft operator may desire to maintain accurate records regarding maintenance of an aircraft. For example, without limitation, an aircraft operator may maintain records of maintenance and diagnostic tasks performed on an aircraft to comply with government regulations and for other appropriate purposes.

Currently, records regarding maintenance of an aircraft may be created manually on paper by maintenance personnel. For example, maintenance personnel may sign a piece of paper identifying maintenance to be performed on an aircraft to indicate that the maintenance identified was performed by the maintenance personnel. Current manual methods of providing a record of aircraft maintenance may provide limited information to the aircraft operator regarding the maintenance performed on the aircraft. The aircraft operator may desire to obtain more information regarding maintenance performed on an aircraft than is currently provided by maintenance personnel. Moreover, it may be desirable to obtain such information regarding maintenance performed on an aircraft in an efficient and accurate manner.

An aircraft operator also may desire to control maintenance of an aircraft by establishing various policies for aircraft maintenance. Such policies may include various rules for performing maintenance tasks, diagnostic tasks, or both maintenance and diagnostic tasks on an aircraft. For example, without limitation, such policies may identify conditions under which various maintenance tasks, diagnostic tasks, or both maintenance tasks and diagnostic tasks may or may not be performed on the aircraft. The aircraft operator may desire to ensure that such policies are followed when maintenance is performed on the aircraft. Current systems and methods for the maintenance of aircraft and other vehicles may not provide assurance that policies for performing maintenance are being complied with.

Accordingly, it would be beneficial to have a method and apparatus that take into account one or more of the issues discussed above, as well as possible other issues.

SUMMARY

The illustrative embodiments of the present disclosure provide a method of performing a task on a system on a platform. A task script is received by a data processing system on the platform. The task script identifies task steps for performing the task on the system. The task script is run by the data processing system to perform the task on the system.

The illustrative embodiments of the present disclosure also provide an apparatus on a platform comprising a receiver, and a task executer. The receiver is configured to receive a task script. The task script identifies task steps for performing a task on a system on the platform. The task executer is configured to run the task script to perform the task on the system.

The illustrative embodiments of the present disclosure also provide another method of performing a task on a system on a platform. Task instructions are received by a processor unit. The task instructions identify the task to be performed on the system on the platform. A task script for the task is identified by the processor unit in response to receiving the task instructions. The task script is machine executable and identifies task steps for performing the task on the system.

The illustrative embodiments of the present disclosure also provide a method of auditing a task performed on a system on a platform. A report generated on the platform is received by a data processing system. The report indicates the task performed on the system on the platform and is signed with a digital signature for the platform. The digital signature for the platform is checked by the data processing system to determine whether the report is authentic. An audit log for auditing the task performed on the system on the platform is created using the report in response to a determination that the report is authentic.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

FIG. 10 is an illustration of block diagram of a data processing system in accordance with an illustrative embodiment.

DETAILED DESCRIPTION

Figure 1:
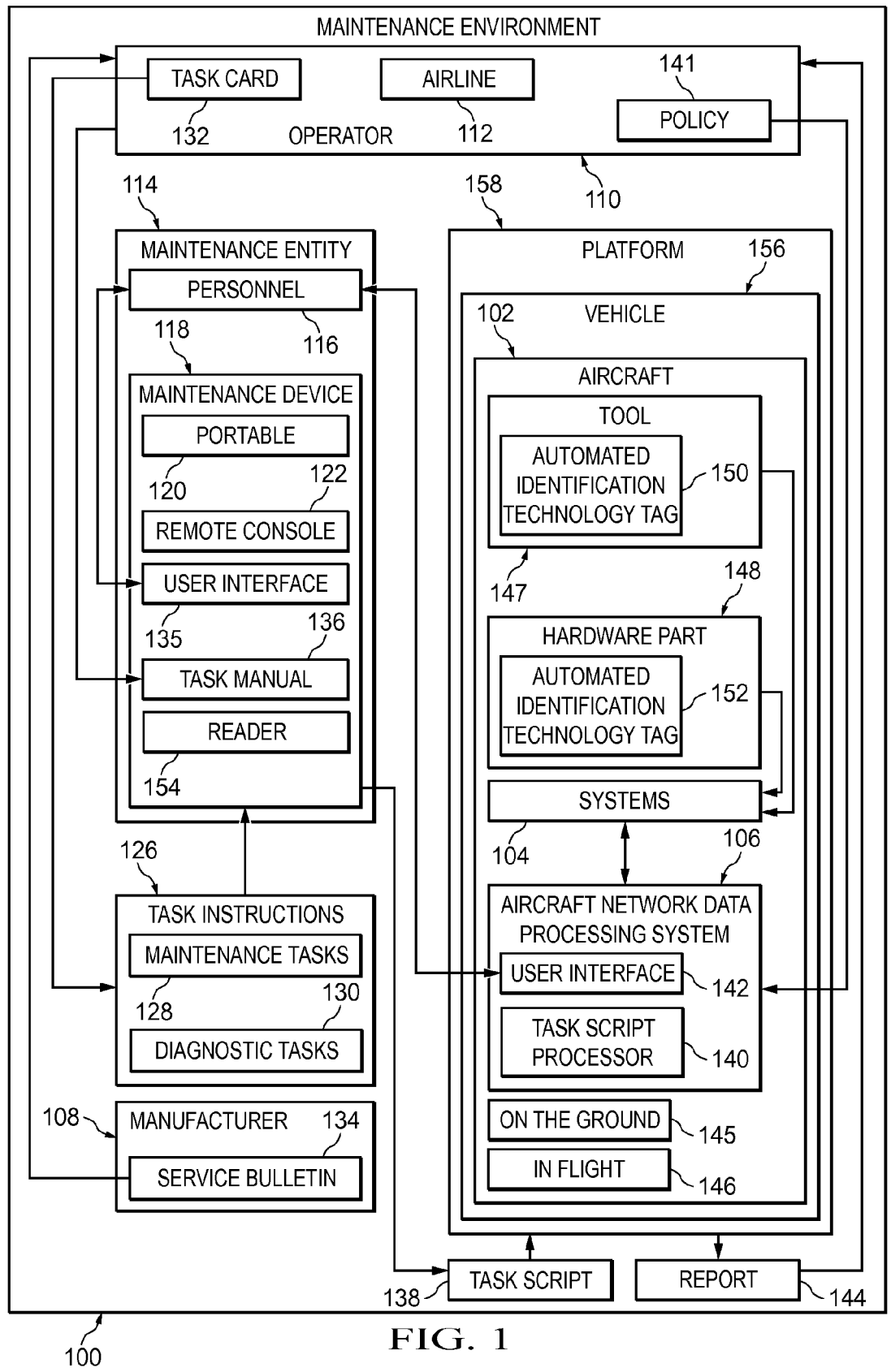
FIG. 1 is an illustration of a block diagram of a maintenance environment in accordance with an illustrative embodiment.

The different illustrative embodiments recognize and take into account a number of different considerations. "A number," as used herein with reference to items, means one or more items. For example, "a number of different considerations" are one or more different considerations.

The different illustrative embodiments recognize and take into account that current systems and methods may rely on maintenance personnel to manually record maintenance performed on an aircraft or other vehicle. Current systems and methods may not provide any automatically recorded artifacts from an aircraft or other vehicle that may attest to what maintenance was performed on the aircraft or other vehicle.

The different illustrative embodiments also recognize and take into account that current systems and methods for creating a maintenance record for an aircraft or other vehicle may not record potentially useful information. For example, without limitation, current systems and methods may not provide a record of the maintenance device or other tools that were used to perform maintenance on an aircraft or other vehicle.

Current systems and methods may not electronically capture information that may be desired to construct an audit trail of maintenance and diagnostic tasks performed on an aircraft or other vehicle. For example, current systems and methods may not report what tasks were performed on an aircraft and who performed those tasks.

The different illustrative embodiments recognize and take into account that the absence of complete auditing in the maintenance process may be a barrier to the adoption of remote maintenance of aircraft and other vehicles from an operations center. Current processes for aircraft maintenance are defined using paper instructions and traditional human signatures with no verification from a system on the aircraft that the maintenance operations identified in the instructions were actually performed. Currently, maintenance work may require human maintenance personnel to be on site at the aircraft.

The different illustrative embodiments also recognize and take into account that current systems and methods may not provide assurance that policies for performing maintenance and other tasks on an aircraft or other vehicle are adhered to. Current systems and methods may provide little or no verification that policies provided by an operator of an aircraft or other vehicle for performing various tasks on the aircraft or other vehicle are adhered to.

In accordance with an illustrative embodiment, an aircraft or other vehicle may be an active participant in creating a record of maintenance performed on the aircraft or other vehicle. The aircraft or other vehicle also may enforce policies for performing maintenance on the aircraft or other vehicle.

Illustrative embodiments provide an electronic task manual. The task manual includes machine executable task scripts for various tasks that may be performed on various systems on an aircraft or other vehicle. For example, without limitation, the task manual may include task scripts for maintenance tasks, diagnostic tasks, other tasks, or various combinations of tasks that may be performed on systems on an aircraft or other vehicle. A task script may identify various task steps to be performed for a particular task. The task script also may identify various rules for performing the task. For example, without limitation, the task script may identify various preconditions to be satisfied for the task to be performed. Other rules for performing the task may be identified in a policy that may be stored on the aircraft or other vehicle by an operator of the aircraft or other vehicle or another appropriate entity.

A task to be performed on an aircraft or other vehicle may be identified in task instructions provided by an operator of the aircraft or other vehicle to a maintenance entity. The maintenance entity may use an appropriate portable maintenance device or remote console to retrieve the task script for the task identified in the task instructions from the task manual and to load the task script on the aircraft or other vehicle. The task script may be signed with a digital signature identifying the source of the task script. The task script also may be signed by the maintenance entity with a digital signature identifying the maintenance entity before the task script is loaded on the aircraft or other vehicle. For example, without limitation, the maintenance entity digital signature may include a digital signature identifying personnel performing the task, a digital signature identifying a maintenance device used to perform the task, or both.

The task script may be run on a data processing system on the aircraft or other vehicle to perform the task. The data processing system may be configured to check the various digital signatures provided with the task script to determine whether the task script is authentic before running the task script. The data processing system also may be configured to ensure that conditions for performing the task, as indicated by the rules in the task script, the policy, or both, are satisfied before running the task script.

A report may be generated automatically by the data processing system to indicate the task performed on the aircraft or other vehicle. The report may include information regarding performance of the task on the aircraft or other vehicle that is not provided by current systems and methods. The report may be signed with a digital signature for the aircraft or other vehicle, to identify the aircraft or other vehicle as the source of the report. The signed report may be sent from the aircraft or other vehicle to a location off of the aircraft or other vehicle for review, storage, or any other appropriate use or combination of uses.

Turning to FIG. 1, an illustration of a block diagram of a maintenance environment is depicted in accordance with an illustrative embodiment. Maintenance environment 100 may include any appropriate environment for maintaining aircraft 102.

Aircraft 102 may be a commercial passenger aircraft, a cargo aircraft, a private or personal aviation aircraft, a military aircraft, or any other appropriate type of aircraft that may be used for any appropriate purpose. Aircraft 102 may be a fixed wing, rotary wing, or lighter-than-air aircraft. Aircraft 102 may comprise a manned aircraft or an unmanned aerial vehicle.

Aircraft 102 may include various systems 104 for performing various functions on aircraft 102. Systems 104 may include electronic, mechanical, electro-mechanical, other systems, or various combinations of systems on aircraft 102. For example, without limitation, systems 104 may include line-replaceable units for performing various functions on aircraft 102. Systems 104 on aircraft 102 may comprise hardware, software, or hardware and software. Any appropriate hardware or hardware in combination with software may be used to implement the functions performed by systems 104 on aircraft 102.

Systems 104 on aircraft 102 may be connected to aircraft network data processing system 106. Aircraft network data processing system 106 may comprise any appropriate data processing system on aircraft 102 that may be configured to perform various data processing functions on aircraft 102. Aircraft network data processing system 106 may be connected to systems 104 on aircraft 102 in any appropriate manner to provide communication of data in any appropriate form between systems 104 and aircraft network data processing system 106 on aircraft 102.

Manufacturer 108 may be any appropriate entity that manufactures aircraft 102 for operator 110 of aircraft 102. Operator 110 may be any appropriate entity that operates aircraft 102 for any appropriate purpose. For example, without limitation, when aircraft 102 is a commercial passenger aircraft, operator 110 may be airline 112. Alternatively, operator 110 may be a military organization, any other appropriate government or private entity, or any appropriate combination of entities. Operator 110 may be responsible for maintaining aircraft 102 in an appropriate operating condition.

Maintenance entity 114 may be any appropriate entity that maintains aircraft 102 for operator 110 of aircraft 102. For example, without limitation, maintenance entity 114 may be manufacturer 108 of aircraft 102, operator 110 of aircraft 102, or any other appropriate entity.

Maintenance entity 114 may include personnel 116. Personnel 116 may include mechanics, technicians, or any other appropriate maintenance personnel or other personnel for performing maintenance or other tasks on aircraft 102. Personnel 116 are human beings.

Personnel 116 may use various tools for performing maintenance or other tasks on aircraft 102. For example, without limitation, personnel 116 may use maintenance device 118 to perform maintenance or other tasks on aircraft 102.

Maintenance device 118 may be portable 120. For example, without limitation, maintenance device 118 may be a laptop computer or another appropriate data processing device that is portable 120 with respect to aircraft 102. In this case, personnel 116 may move maintenance device 118 to the location of aircraft 102 to use maintenance device 118 to perform maintenance or other tasks on aircraft 102. Maintenance device 118 that is portable 120 may be connected to aircraft network data processing system 106 on aircraft 102 via any appropriate wired or wireless connection for providing communication of data in any appropriate form between maintenance device 118 and aircraft network data processing system 106.

Alternatively, or in addition, maintenance device 118 may comprise remote console 122. Remote console 122 may comprise a data processing system at a location remote from aircraft 102. For example, without limitation, remote console 122 may be at an operations center or other location remote from aircraft 102. Remote console 122 may be configured to allow personnel 116 to use remote console 122 to perform maintenance and other tasks on aircraft 102 from the remote location. Remote console 122 may be connected to aircraft network data processing system 106 on aircraft 102 via any appropriate communications link between aircraft 102 and remote console 122 for providing communication of data in any appropriate form between aircraft network data processing system 106 and remote console 122 at a location remote from aircraft 102.

Maintenance device 118 may be configured to manage the identification and authentication of personnel 116 who use maintenance device 118 to perform a task on aircraft 102. Maintenance device 118 may be configured to identify and authenticate personnel 116 in any appropriate manner. For example, without limitation, maintenance device 118 may be configured to identify and authenticate personnel 116 using identification information and a password entered by personnel 116 into maintenance device 118 via user interface 135, using identification information on a smart card presented by personnel 116 and read by maintenance device 118, by an appropriate operations center process for identifying personnel 116, or in any other appropriate manner or combination of manners.

Maintenance or other tasks to be performed on systems 104 on aircraft 102 may be identified by task instructions 126. For example, without limitation, task instructions 126 may identify a number of maintenance tasks 128, a number of diagnostic tasks 130, a number of other tasks, or various combinations of tasks to be performed on systems 104 on aircraft 102. For example, without limitation, maintenance tasks 128 may include reworking or replacing systems 104 or parts of systems 104 on aircraft 102 or any other appropriate task or combination of tasks for maintaining systems 104 on aircraft 102. For example, without limitation, diagnostic tasks 130 may include determining the condition of systems 104 on aircraft 102, determining appropriate maintenance tasks 128 to perform on systems 104 on aircraft 102, or any other appropriate task or combination of tasks for any other appropriate purpose or various combinations of purposes.

Task instructions 126 may be provided in any appropriate electronic form by operator 110 of aircraft 102 or any other appropriate entity. For example, without limitation, task instructions 126 may comprise an electronic version of task card 132 provided by operator 110 to maintenance entity 114 to identify maintenance or other tasks to be performed on aircraft 102. Task instructions 126 may be provided from operator 110 or another appropriate entity to maintenance entity 114 in any appropriate manner. Task instructions 126 may be signed with a digital signature by operator 110 or another appropriate entity to identify operator 110 or the other appropriate entity as the source of task instructions 126 in a known manner.

For example, without limitation, task instructions 126 may be provided by operator 110 in response to service bulletin 134 provided by manufacturer 108 of aircraft 102 to identify maintenance or other tasks to be performed on aircraft 102. Service bulletin 134 may be provided by manufacturer 108 to operator 110 of aircraft 102 in any appropriate manner and form.

Maintenance device 118 may be configured to receive task instructions 126 provided by operator 110 of aircraft 102 or another appropriate entity. Maintenance device 118 may be configured to display task instructions 126 received by maintenance device 118 to personnel 116 on user interface 135 on maintenance device 118.

Task manual 136 may comprise a number of task scripts. The task scripts in task manual 136 may identify specific steps for performing various tasks on systems 104 on aircraft 102 in any appropriate machine executable electronic form. For example, without limitation, the task scripts in task manual 136 may identify specific steps for performing maintenance tasks 128, diagnostic tasks 130, other tasks, or various combinations of tasks that may be identified in task instructions 126. The task scripts in task manual 136 also may identify rules for executing the various task scripts. For example, without limitation, the task scripts may identify various preconditions to be satisfied for the task scripts to be executed.

Task manual 136 may be stored in any appropriate form in maintenance device 118. Alternatively, or in addition, task manual 136 may be stored in any other appropriate location in an appropriate manner such that task scripts in task manual 136 may be retrieved by or using maintenance device 118.

Task manual 136 may be provided by manufacturer 108 of aircraft 102, another appropriate entity, or various combinations of entities. For example, without limitation, task manual 136 may be provided by manufacturer 108 to operator 110 of aircraft 102 in any appropriate manner. Operator 110 of aircraft 102 may provide task manual 136 to maintenance entity 114 in any appropriate manner for use by maintenance entity 114 to maintain aircraft 102. Operator 110 may modify task manual 136 received from manufacturer 108 before providing task manual 136 to maintenance entity 114. For example, without limitation, operator 110, maintenance entity 114, or another appropriate entity may load task manual 136 on maintenance device 118, store task manual 136 in an another appropriate location for use by maintenance entity 114 to maintain aircraft 102, or both.

The task scripts in task manual 136 may be signed with digital signatures to identify the source of the task scripts in a known manner. For example, without limitation, the task scripts in task manual 136 may be signed with digital signatures by manufacturer 108 of aircraft 102 or another appropriate entity to identify manufacturer 108 or the other appropriate entity as the source of the task scripts in task manual 136.

Maintenance device 118 may be configured to identify task script 138 in task manual 136 for a task identified in task instructions 126 received by maintenance device 118. For example, without limitation, user interface 135 on maintenance device 118 may be configured to allow personnel 116 to identify or select task script 138 from task manual 136 for the task identified in task instructions 126. Alternatively, or in addition, maintenance device 118 may be configured to identify task script 138 for the task identified in task instructions 126 automatically, without input from personnel 116, in response to receiving task instructions 126 by maintenance device 118.

Maintenance device 118 may be configured to retrieve a copy of the identified task script 138 for the task identified in task instructions 126 from task manual 136 and to send task script 138 to aircraft 102 in any appropriate manner. For example, maintenance device 118 may be configured to send task script 138 to aircraft network data processing system 106 on aircraft 102 via any appropriate communications link between maintenance device 118 and aircraft 102. For example, without limitation, the sending of task script 138 to aircraft 102 may be initiated by personnel 116 using user interface 135 on maintenance device 118. Alternatively, or in addition, task script 138 may be sent to aircraft 102 automatically by maintenance device 118, without input from personnel 116, in response to identifying task script 138 in task manual 136.

Maintenance device 118 may be configured to sign task script 138 with a digital signature to identify maintenance entity 114 before sending task script 138 to aircraft 102. For example, without limitation, task script 138 may be signed with a digital signature to identify personnel 116, a digital signature to identify maintenance device 118, or both, before task script 138 is sent to aircraft network data processing system 106 on aircraft 102.

Task script processor 140 may be configured to run task script 138 to perform a task on systems 104 on aircraft 102. For example, task script 138 may be run by task script processor 140 to perform the specific task steps identified in task script 138 on systems 104 on aircraft 102. Task script processor 140 may be implemented in any appropriate manner in hardware or in hardware in combination with software on aircraft 102. For example, without limitation, task script processor 140 may be implemented in an appropriate manner on aircraft network data processing system 106 on aircraft 102. Alternatively, or in addition, a portion or all of the functions performed by task script processor 140 may be implemented in maintenance device 118.

Task script processor 140 may be configured to check the various digital signatures provided with task script 138 in a known manner to determine whether task script 138 is authentic before running task script 138. For example, without limitation, task script 138 may be determined to be authentic when task script 138 is determined to be signed with a digital signature from a known source and is unchanged since task script 138 was signed with the digital signature. In addition, without limitation, task script 138 may be determined to be authentic when task script 138 is determined to be signed with a digital signature to identify known personnel 116, a known maintenance device 118, or both.

Task script processor 140 also may be configured to enforce rules for performing the task identified in task script 138 on systems 104 on aircraft 102. For example, without limitation, the rules may identify a number of conditions for performing the task on systems 104 on aircraft 102. In this case, task script processor 140 may be configured to determine whether the conditions for performing the task as identified in the rules are satisfied before running task script 138 to perform the task.

A number of rules for performing the task identified in task script 138 may be included in task script 138. Alternatively, or in addition, rules for performing various tasks on various systems 104 on aircraft 102 may be defined by policy 141. For example, without limitation, policy 141 may be provided by operator 110 of aircraft 102 or another appropriate entity. Policy 141 may be stored on aircraft 102 in any appropriate manner and form, stored in another appropriate location from which policy 141 may be accessed by aircraft network data processing system 106 for use by task script processor 140, or both. For example, without limitation, policy 141 may be provided by operator 110 of aircraft 102 or another appropriate entity in the form of a loadable software aircraft part that may be loaded on aircraft 102 in a known appropriate manner.

Personnel 116 may interact with the running of task script 138 on aircraft 102 via user interface 142 for aircraft network data processing system 106 on aircraft 102. Alternatively, or in addition, personnel 116 may interact with the running of task script 138 via user interface 135 on maintenance device 118. For example, without limitation, task script 138 may identify various options for performing a task on systems 104 on aircraft 102. In this case, task script processor 140 may be configured to display the various options to personnel 116 on, and receive option selections from personnel 116 via, user interface 142 for aircraft network data processing system 106 on aircraft 102, user interface 135 on maintenance device 118, or both. In any case, user interfaces 135 and 142 may be implemented in any appropriate manner using any appropriate devices for displaying information to personnel 116 in any appropriate form and receiving input from personnel 116.

Task script processor 140 also may be configured to generate report 144. Report 144 may include desired information regarding the performance of tasks on systems 104 on aircraft 102 in any appropriate form. For example, without limitation, report 144 may indicate that the task identified in task script 138 was performed on systems 104 on aircraft 102, personnel 116 that performed the task, maintenance device 118 that was used to perform the task, other appropriate information regarding performing the task on systems 104 on aircraft 102, or various combinations of such information.

Task script processor 140 may be configured to sign report 144 with a digital signature for aircraft 102 to identify aircraft 102 as the source of report 144 in a known manner. Alternatively, or in addition, report 144 may be signed with a digital signature to identify systems 104 on aircraft 102 on which the task described in report 144 was performed.

Task script processor 140 may be configured to send report 144 to any appropriate location off of aircraft 102 in any appropriate manner. For example, without limitation, report 144 may be sent to operator 110 of aircraft 102, another appropriate entity, or various combinations of entities, via any appropriate communications link provided by aircraft 102. Alternatively, or in addition, report 144 may be sent to maintenance device 118 via the connection between maintenance device 118 and aircraft network data processing system 106. For example, without limitation, report 144 may be sent to operator 110 of aircraft 102, maintenance entity 114, another appropriate entity, or various combinations of entities via maintenance device 118.

Operator 110 or another appropriate entity may use report 144 for any appropriate purpose. For example, without limitation, operator 110 may use report 144 to create an audit log for auditing tasks performed on aircraft 102. Alternatively, or in addition, an audit log based on report 144 may be created and maintained on aircraft 102.

Task script processor 140 may be configured to remove task script 138 from aircraft 102. For example, without limitation, task script 138 may be removed from aircraft 102 after the task identified in task script 138 is performed on systems 104 on aircraft 102 or if it is determined that the task identified in task script 138 cannot be performed on systems 104 on aircraft 102 for some reason.

Airline 112 or another operator 110 of aircraft 102 may desire or be required to maintain strict control of the operating configuration of aircraft 102. The operating configuration of aircraft 102 may include software that is loaded and active on aircraft 102 when aircraft 102 is in operation. Therefore, airline 112 or other operator 110 of aircraft 102 may require special procedures to be followed for loading and documenting software on aircraft 102 that may be part of the operating configuration of aircraft 102. Preferably, task script 138 may be loaded and run on aircraft 102 when aircraft 102 is on the ground 145 and not in operation. Task script 138 preferably then may be removed from aircraft 102 before aircraft 102 is in flight 146 following receiving task script 138 on aircraft 102.

In this case, task script 138 is only loaded and active on aircraft 102 when aircraft 102 is on the ground 145 and not in operation. Task script 138 thus may be loaded and used on aircraft 102 without affecting the operating configuration of aircraft 102. Therefore, the special procedures for loading and documenting software on aircraft 102 that may be part of the operational configuration of aircraft 102 may not need to be followed for loading task script 138 on aircraft 102. A task performed on systems 104 on aircraft 102 by running task script 138 may affect the operating configuration of aircraft 102. In this case, illustrative embodiments may provide an improved capability for controlling and documenting any such change to the operating configuration of aircraft 102 resulting from performing a task on systems 104 on aircraft 102.

Illustrative embodiments are described above with reference to electronically-enabled maintenance operations and other tasks that may be performed on systems 104 on aircraft 102. Illustrative embodiments also may be applicable to various mechanical and electro-mechanical maintenance operations and other tasks that may be performed on systems 104 on aircraft 102. For example, without limitation, task script 138 may identify mechanical task steps for performing a task on systems 104 on aircraft 102.

Maintenance device 118 and aircraft network data processing system 106 are examples of tools that may be used to perform electronically-enabled maintenance operations and other tasks on systems 104 on aircraft 102. A mechanical task may be performed on systems 104 on aircraft 102 using tool 147. Tool 147 may include any appropriate device that may be used by personnel 116 on aircraft 102 to perform a mechanical task on systems 104 on aircraft 102. Automated identification technology tag 150 may be attached to or otherwise associated with tool 147. Identification information for tool 147 may be stored in automated identification technology tag 150 in any appropriate manner and form.

A mechanical task may include inspecting, reworking, replacing, or performing another appropriate task on or using hardware part 148 that may be part of systems 104 on aircraft 102. Automated identification technology tag 152 may be attached to or otherwise associated with hardware part 148. Identification information for hardware part 148 may be stored in automated identification technology tag 152 in any appropriate manner and form. For example, without limitation, one or both of automated identification technology tag 150 and automated identification technology tag 152 may comprise a radio frequency identification tag, contact memory, barcode, or another appropriate type of automated identification technology tag.

Reader 154 may be configured to read identification information for tool 147 from automated identification technology tag 150 and send the identification information read from automated identification technology tag 150 to task script processor 140, to read identification information for hardware part 148 from automated identification technology tag 152 and to send the identification information read from automated identification technology tag 152 to task script processor 140, or both. Reader 154 may be implemented and operated on aircraft 102 in any appropriate manner. For example, without limitation, reader 154 may be implemented as part of maintenance device 118 or in another appropriate manner such that reader 154 may be operated by personnel 116 on aircraft 102 to provide identification information for tool 147, hardware part 148, or both tool 147 and hardware part 148, to task script processor 140. Alternatively, or in addition, reader 154 may be located in an appropriate position on aircraft 102 and operated automatically by task script processor 140 to provide identification information for tool 147, hardware part 148, or both tool 147 and hardware part 148, to task script processor 140.

For example, without limitation, reader 154 may be operated as part of the process of running task script 138 to provide accurate identification information to task script processor 140 for tool 147, hardware part 148, or both tool 147 and hardware part 148, that may be used for, affected by, or otherwise related to mechanical task steps identified in task script 138. Such identification information may be used by task script processor 140 to indicate tool 147, hardware part 148, or both tool 147 and hardware part 148, in report 144 for the task performed, as appropriate.

Aircraft 102 is an example of vehicle 156. Illustrative embodiments may be used to perform maintenance and other tasks on vehicle 156 other than aircraft 102. Vehicle 156 may comprise any vehicle configured for operation in the air, in space, on land, on water, under water, or in any other medium or combinations of media.

Vehicle 156 is an example of platform 158. Illustrative embodiments may be used to perform maintenance and other tasks on platform 158 other than vehicle 156. For example, without limitation, platform 158 may be a building, an oil rig, or any other appropriate mobile or fixed platform.

The illustration of FIG. 1 is not meant to imply physical or architectural limitations to the manner in which different illustrative embodiments may be implemented. Other components in addition to, in place of, or in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 2:
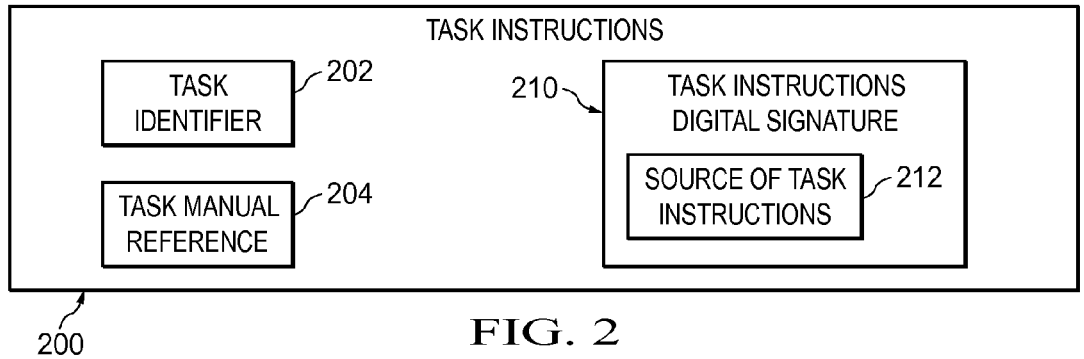
FIG. 2 is an illustration of a block diagram of task instructions in accordance with an illustrative embodiment.

Turning to FIG. 2, an illustration of a block diagram of task instructions is depicted in accordance with an illustrative embodiment. Task instructions 200 may be an example of one implementation of task instructions 126 in FIG. 1. Task instructions 200 may be provided in any appropriate electronic form.

Task instructions 200 may include task identifier 202 and task manual reference 204. Task identifier 202 may include any appropriate information identifying a task to be performed on a system on a vehicle. For example, without limitation, task identifier 202 may comprise a name for the task to be performed. Task manual reference 204 may include any appropriate information identifying information for performing the task in a task manual. For example, without limitation, task manual reference 204 may include a uniform resource identifier or any other appropriate reference or link to the information for performing the task in an electronic task manual.

In some cases, task instructions 200 may include information for performing the task identified by task identifier 202. For example, without limitation, task instructions 200 may include information for performing the task when such information is not available in a task manual. For example, without limitation, a human readable description of how to perform the task, a machine executable task script identifying task steps for performing the task, other information for performing the task, or various combinations of information for performing the task may be included in task instructions 200.

Task instructions 200 may be signed with task instructions digital signature 210 by source of task instructions 212 to identify source of task instructions 212 in a known manner. For example, without limitation, source of task instructions 212 may be an operator of an aircraft or other vehicle or another appropriate entity.

Figure 3:
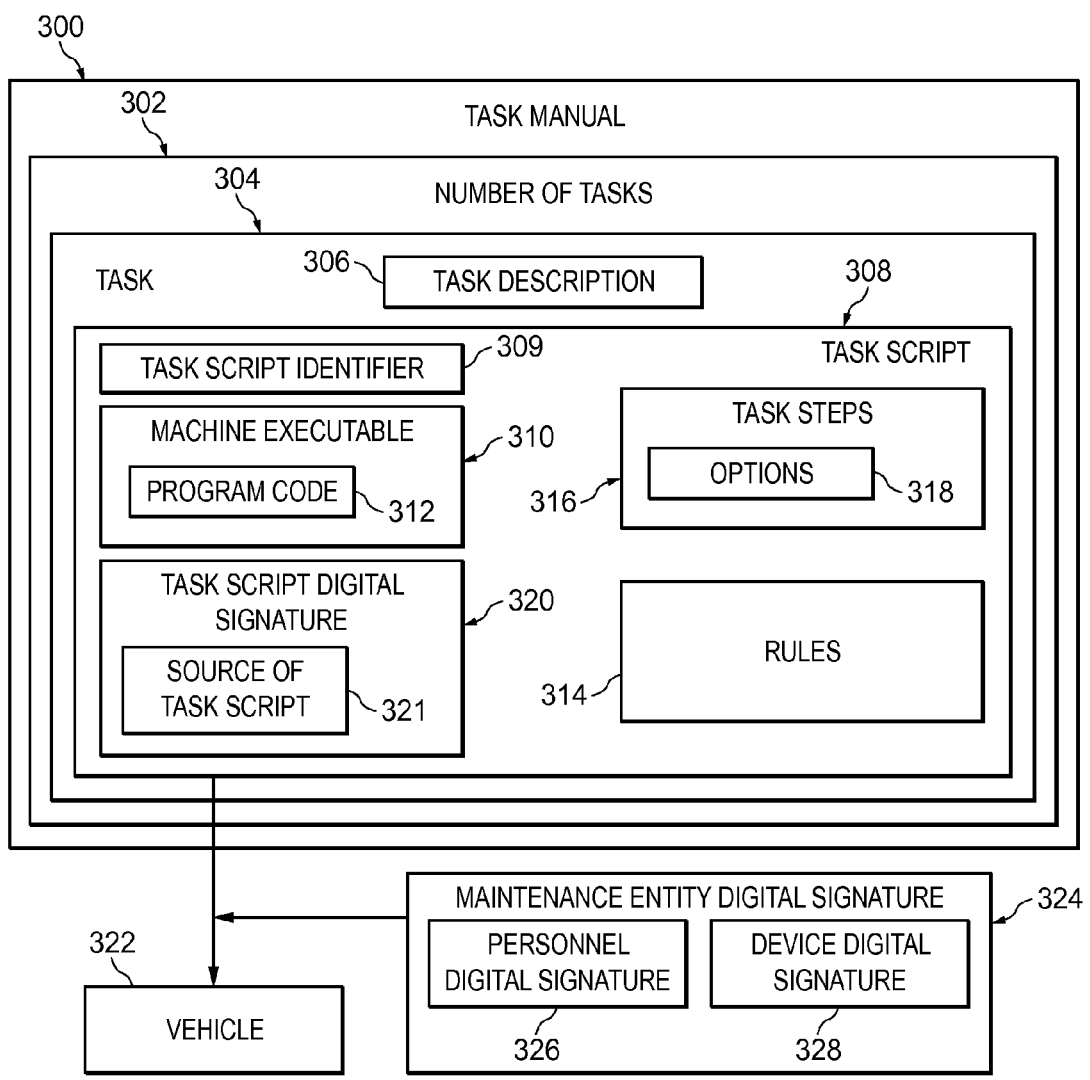
FIG. 3 is an illustration of a block diagram of a task manual in accordance with an illustrative embodiment.

Turning to FIG. 3, an illustration of a block diagram of a task manual is depicted in accordance with an illustrative embodiment. Task manual 300 may be an example of one implementation of task manual 136 in FIG. 1. Task manual 300 may be provided in any appropriate electronic form.

Task manual 300 may include information for number of tasks 302 that may be performed on systems on a vehicle. For example, without limitation, number of tasks 302 may include maintenance tasks, diagnostic tasks, other appropriate tasks, or various combinations of tasks.

For each task 304 in number of tasks 302, task manual 300 may include task description 306 and task script 308. Task description 306 may comprise a human readable description of how to perform task 304. For example, without limitation, task description 306 may be read from task manual 300 and displayed in an appropriate manner to personnel performing task 304.

Task script 308 may be identified by task script identifier 309. Task script identifier 309 may include any appropriate information identifying task script 308.

Task script 308 is machine executable 310. Task script 308 that is machine executable 310 may be configured to run on an appropriate data processing system. For example, without limitation, task script 308 may comprise program code 312 in any appropriate programming language that is configured to run on a data processing system on an aircraft or another appropriate data processing system. Alternatively, or in addition, task script 308 may include information in a form other than program code 312 that is configured to be run by or control the running of a computer program running on a data processing system on an aircraft or another appropriate data processing system.

Task script 308 may identify rules 314 for performing task 304 in any appropriate form. For example, without limitation, rules 314 may include preconditions for performing task 304.

Task script 308 may identify task steps 316 for performing task 304 in any appropriate form. Task steps 316 may comprise a sequence of steps to be performed to perform task 304.

Task script 308 may identify options 318 for task steps 316. For example, without limitation, options 318 may identify a number of task steps 316 that may be performed, but do not need to be performed, to perform task 304. As another example, without limitation, options 318 may identify a plurality of task steps 316 from which a single task step may be selected to perform a portion of task 304. As a further example, without limitation, options 318 may identify alternative parts that may be used to perform task steps 316 to perform task 304.

Task script 308 may be signed with task script digital signature 320 by source of task script 321 to identify source of task script 321 in a known manner. For example, without limitation, source of task script 321 may be the manufacturer of an aircraft or other vehicle or another appropriate entity.

Task script 308 may be copied from task manual 300 and sent to vehicle 322 or another appropriate location by a maintenance entity to perform task 304 on a system on vehicle 322. Task script 308 may be signed with maintenance entity digital signature 324 before task script 308 is sent to vehicle 322 or another appropriate location to perform task 304. Maintenance entity digital signature 324 may identify the maintenance entity performing task 304 on the system on vehicle 322 in a known manner. For example, without limitation, maintenance entity digital signature 324 may include personnel digital signature 326 identifying personnel performing task 304 on the system on vehicle 322, device digital signature 328 identifying a maintenance device for performing task 304 on the system on vehicle 322, or both.

Figure 4:
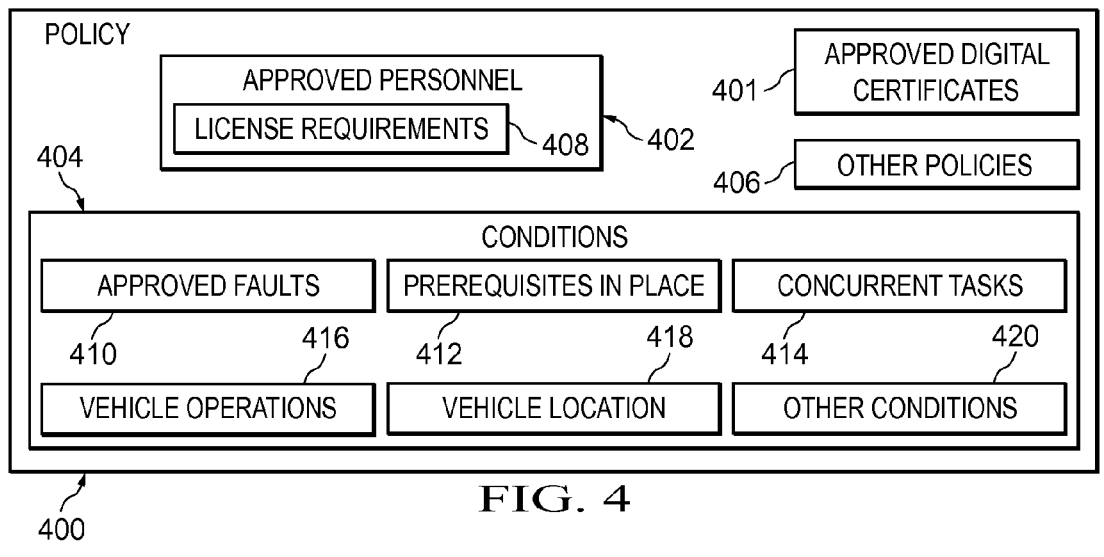
FIG. 4 is an illustration of a block diagram of a policy in accordance with an illustrative embodiment.

Turning to FIG. 4, an illustration of a block diagram of a policy is depicted in accordance with an illustrative embodiment. Policy 400 may be an example of one implementation of policy 141 in FIG. 1. Policy 400 may be provided in any appropriate electronic form.

Policy 400 may indicate a number of rules for performing a task identified in a task script. Rules indicated in policy 400 may be in place of or in addition to rules for performing the task indicated in the task script itself. For example, without limitation, rules indicated in policy 400 may be provided by an operator of an aircraft or other vehicle, whereas rules indicated in the task script may be provided by the manufacturer of the aircraft or other vehicle. Policy 400 may be stored on an aircraft or other vehicle, or otherwise accessible by the aircraft or other vehicle, before task scripts for tasks that may be affected by policy 400 are received on the aircraft or other vehicle. For example, without limitation, policy 400 may indicate approved digital certificates 401, approved personnel 402, conditions 404, other policies 406, or various combinations of policies for performing a task on a system on a vehicle.

Approved digital certificates 401 may indicate the digital certificates that are approved for the various digital signatures that may be provided with a task script. A task script may be determined not to be authentic when the task script is signed with a digital signature having a digital certificate that is not one of approved digital certificates 401. When the task script is determined not to be authentic, the task script may not be run and the task identified by the task script thus may not be performed.

Approved personnel 402 may indicate personnel that are allowed to perform a task identified in a task script. For example, without limitation, approved personnel 402 may indicate the identity of specific personnel that may perform the task, license requirements 408 for personnel that may perform the task, or other characteristics or various combinations of characteristics of personnel that may be allowed to perform the task.

Conditions 404 may indicate various conditions under which a task identified in a task script may or may not be performed. For example, without limitation, conditions 404 may include approved faults 410, prerequisites in place 412, concurrent tasks 414, vehicle operations 416, vehicle location 418, other conditions 420, or various combinations of conditions.

Approved faults 410 may indicate a number of faults that must be determined to have occurred in a system before a task may be allowed to be performed on the system. For example, without limitation, an unscheduled maintenance task may not be allowed to be performed on a system unless a fault is determined to be present.

Prerequisites in place 412 may indicate requirements for performing a task that must be in place before the task may be allowed to be started. For example, without limitation, prerequisites in place 412 may indicate a number of loadable software aircraft parts that may be needed to complete a task on a system on an aircraft and that must be available on the aircraft before the task may begin.

Concurrent tasks 414 may indicate that a task may or may not be performed on an aircraft or other vehicle when a number of other specified tasks are being performed on the aircraft or other vehicle at the same time. For example, without limitation, concurrent tasks 414 may indicate that a task may not be performed when performing the task would conflict with ongoing maintenance actions or diagnostic tests.

Vehicle operations 416 may indicate that a task may or may not be performed on a vehicle when the vehicle is performing a number of specified operations or in a number of specified operational states. For example, without limitation, vehicle operations 416 may indicate that a task may not be performed on an aircraft while the aircraft is in flight.

Vehicle location 418 may indicate that a task may or may not be performed on a vehicle when the vehicle is at a number of specified locations. For example, without limitation, vehicle location 418 may indicate that a task may be performed on a vehicle only when the vehicle is located at a number of specified maintenance facilities.

Figure 5:
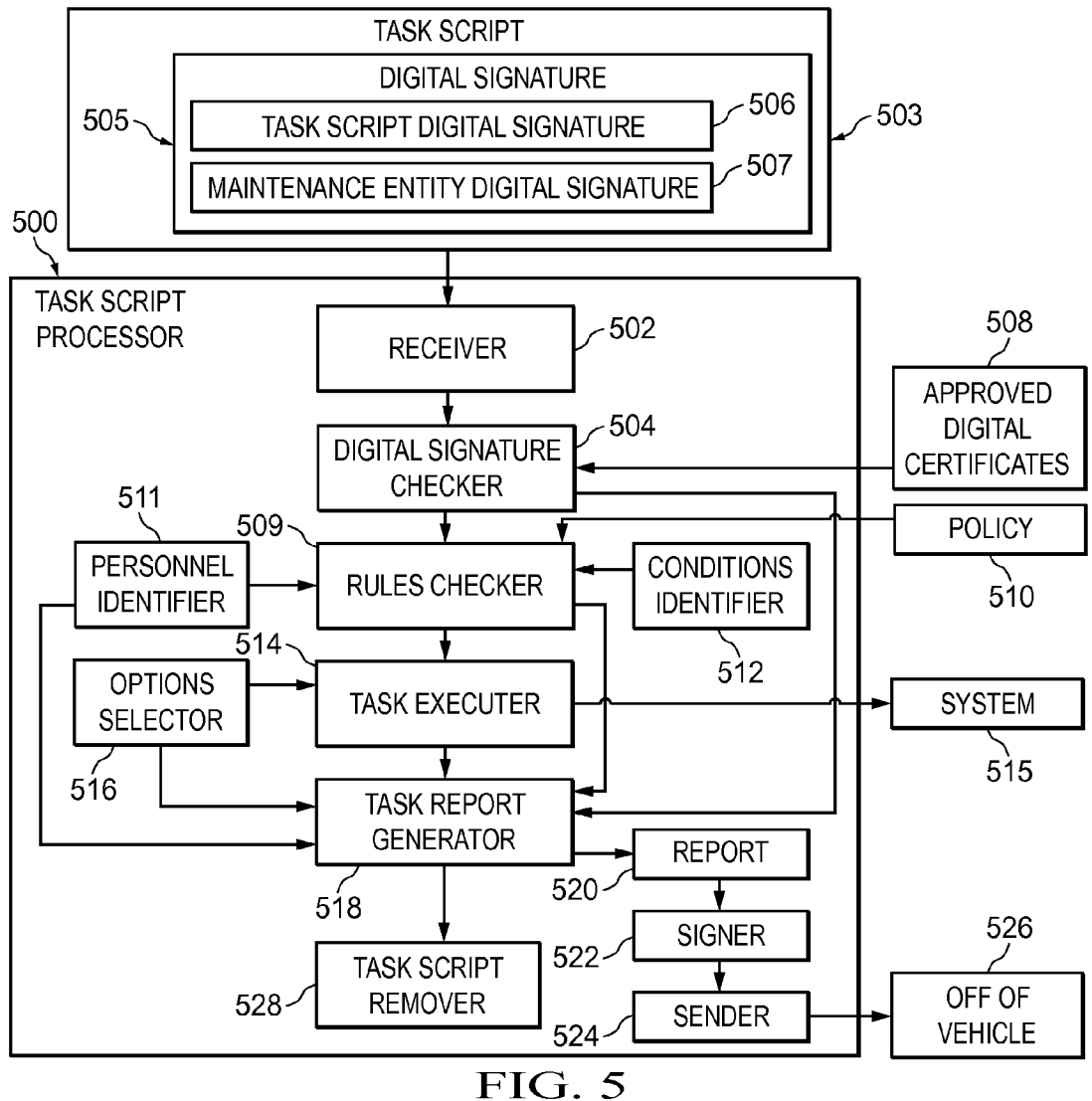
FIG. 5 is an illustration of a block diagram of a task script processor in accordance with an illustrative embodiment.

Turning to FIG. 5, an illustration of a block diagram of a task script processor is depicted in accordance with an illustrative embodiment. Task script processor 500 may be an example of one implementation of task script processor 140 in FIG. 1. For example, without limitation, task script processor 500 may be implemented in any appropriate data processing system.

Task script processor 500 includes receiver 502 configured to receive task script 503. For example, task script 503 may identify task steps for performing a task on an aircraft or other vehicle. Receiver 502 may be configured to receive task script 503 on the aircraft or other vehicle in any appropriate format and via any appropriate communications link.

Task script processor 500 may include digital signature checker 504 configured to determine whether task script 503 is authentic. For example, digital signature checker 504 may be configured to check digital signature 505 received with task script 503 in a known manner to determine whether task script 503 is authentic. Digital signature 505 may include a number of digital signatures that may be checked by digital signature checker 504. For example, digital signature 505 may include task script digital signature 506, maintenance entity digital signature 507, or both. Task script digital signature 506 may identify the source of task script 503. Maintenance entity digital signature 507 may identify a maintenance entity providing task script 503 to task script processor 500. For example, without limitation, maintenance entity digital signature 507 may include a personnel digital signature identifying personnel performing the task identified in task script 503, a device digital signature identifying a maintenance device for performing the task identified in task script 503, or both.

Task script 503 may be determined not to be authentic when task script 503 is signed with a digital signature having a digital certificate that is not one of approved digital certificates 508. For example, without limitation, approved digital certificates 508 may be identified in policy 510, or in another appropriate manner. Task script 503 may not be run, and the task identified by task script 503 thus may not be performed, when task script 503 is determined not to be authentic.

Task script processor 500 may include rules checker 509 configured to determine whether rules for running task script 503 to perform the task identified therein are satisfied. For example, without limitation, rules for running task script 503 may be identified by rules checker 509 in task script 503, in policy 510 that is separate from task script 503, or both.

For example, without limitation, the rules for running task script 503 may identify personnel that are allowed to perform the task identified in task script 503. Rules checker 509 may be configured to use information provided by personnel identifier 511 to determine whether personnel who are attempting to perform the task identified in task script 503 are approved to perform the task. Personnel identifier 511 may be configured to identify personnel attempting to perform the task identified in task script 503 in any appropriate manner. For example, without limitation, personnel identifier 511 may be configured to identify personnel attempting to perform the task identified in task script 503 from a personnel digital signature for task script 503. Alternatively, or in addition, personnel identifier 511 may be configured to identify and authenticate personnel attempting to perform the task using identification information and a password entered by personnel via a user interface, using identification information on a smart card presented by the personnel, or in any other appropriate manner or combination of manners.

For example, without limitation, the rules for running task script 503 may indicate various conditions that must be satisfied before performing the task identified in task script 503. Rules checker 509 may be configured to use information provided by conditions identifier 512 to determine whether conditions for performing the task identified in task script 503 are satisfied. Conditions identifier 512 may be configured to identify various conditions in any appropriate manner. For example, without limitation, conditions identifier 512 may use input from various systems and sensors on an aircraft or other vehicle to identify various conditions on the aircraft or other vehicle that may be relevant to performing various tasks on the aircraft or other vehicle.

Task script processor 500 includes task executer 514 configured to run task script 503 to perform the task identified in task script 503 on system 515. For example, without limitation, task script 503 may be run by task script executer 514 when task script 503 is determined to be authentic by digital signature checker 504 and any rules for performing the task are determined to be satisfied by rules checker 509. In the present application, including in the claims, unless explicitly stated otherwise, to "run" or "running" a task script and similar wording means displaying, performing, or taking any other appropriate action with task steps identified in a task script by a data processing system to perform a task.

Task script 503 may indicate various options for performing the task identified therein. Options selector 516 may be configured to determine which of the options identified in task script 503 are to be used when running task script 503 by task executer 514. Alternatively, or in addition, options selector 516 may be configured to determine which of the options identified in task script 503 are to be used before running task script 503 by task executer 514. For example, without limitation, options selector 516 may be configured to display various options to personnel and to receive option selections from among the displayed options by the personnel via an appropriate user interface.

Task script processor 500 may include task report generator 518 configured to generate report 520. Report 520 may include information regarding the task performed on system 515 in any appropriate form. For example, without limitation, report 520 may indicate the task performed on system 515, personnel performing the task as identified by personnel identifier 511, options selected for performing the task as identified by options selector 516, a maintenance device used for performing the task, other appropriate information, or various combinations of information regarding the task performed on system 515. Alternatively, or in addition, report 520 may indicate that task script 503 was not authenticated by digital signature checker 504, rules for performing the task that rules checker 509 determined were not satisfied, other information, or various combinations of information when the task identified in task script 503 is not performed for some reason.

Task script processor 500 may include signer 522 configured to sign report 520 with a digital signature to identify the source of report 520 in a known manner. For example, without limitation, signer 522 may be configured to sign report 520 with a vehicle digital signature for the aircraft or other vehicle on which the task identified in task script 503 is performed, a system digital signature for system 515 on which the task identified in task script 503 is performed, or both.

Task script processor 500 may include sender 524 configured to send report 520, with the digital signature identifying the source of report 520, to a desired location off of vehicle 526. Sender 524 may be configured to send report 520 off of vehicle 526 in any appropriate format and via any appropriate communications link. For example, without limitation, sender 524 may be configured to send report 520 to an operator of the vehicle or any other appropriate entity or various combinations of entities.

Task script processor 500 may include task script remover 528 configured to remove task script 503 from an aircraft or other vehicle. Task script remover 528 may be configured to remove task script 503 from the aircraft or other vehicle in any appropriate manner after task script 503 is run on the aircraft or other vehicle or after it is determined that task script 503 cannot be run on the aircraft or other vehicle for some reason. Preferably, task script 503 may be received by receiver 502 on an aircraft when the aircraft is on the ground and not in operation and removed from the aircraft before the aircraft is in flight following receiving task script 503 on the aircraft so that task script 503 does not become a part of or otherwise affect the operational configuration of the aircraft.

Figure 6:
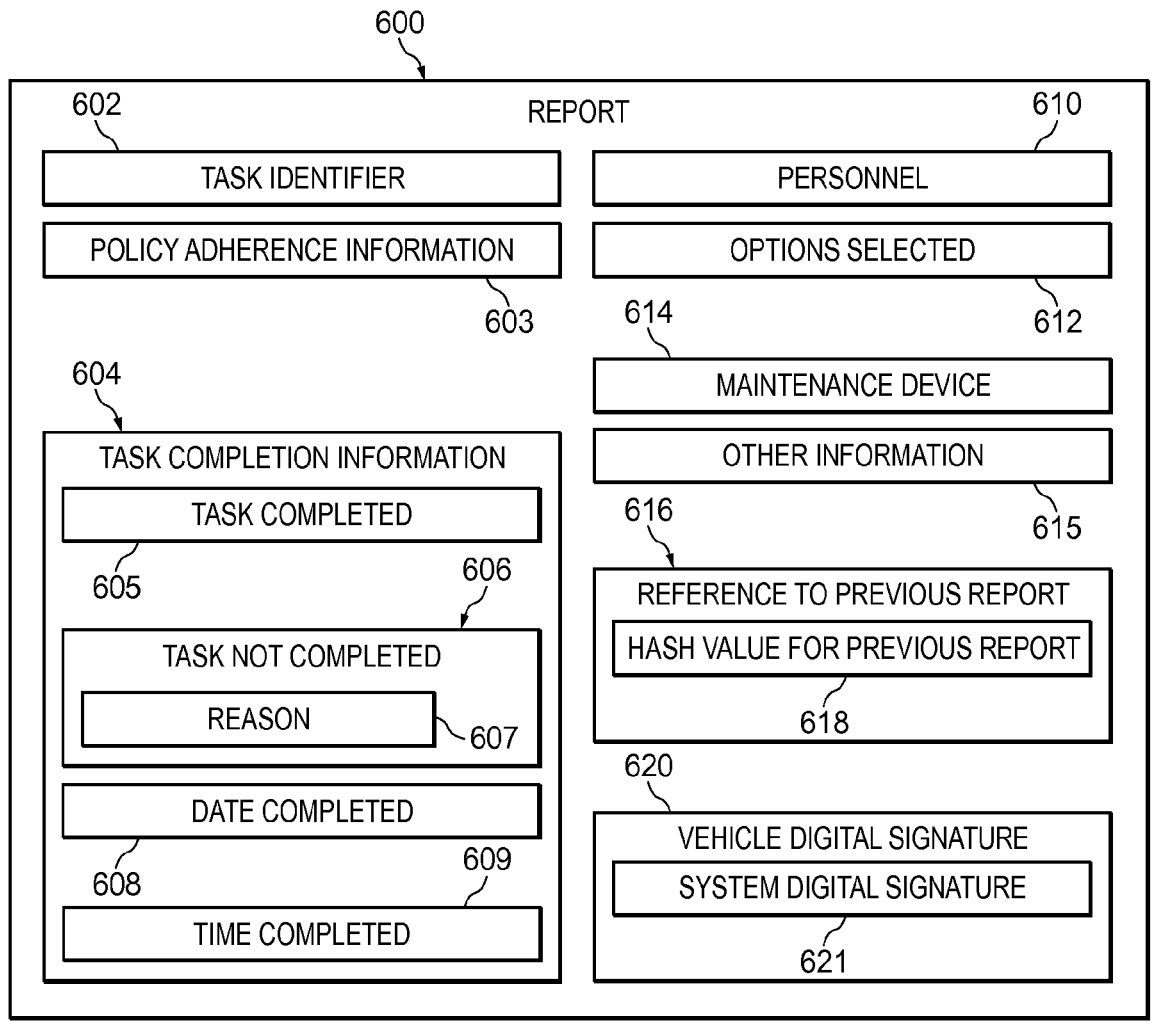
FIG. 6 is an illustration of a block diagram of a report in accordance with an illustrative embodiment.

Turning to FIG. 6, an illustration of a block diagram of a report is depicted in accordance with an illustrative embodiment. Report 600 may be an example of one implementation of report 144 in FIG. 1 and report 520 in FIG. 5. Report 600 may be provided in any appropriate electronic form.

Report 600 may include any appropriate information regarding a task identified in a task script that is performed or attempted to be performed on a system on an aircraft or other vehicle. For example, without limitation, report 600 may indicate task identifier 602, policy adherence information 603, task completion information 604, personnel 610, options selected 612, maintenance device 614, other information 615, or various combinations of information regarding a task performed, or attempted to be performed, on a system on a vehicle. Task identifier 602 may indicate the task that was performed or attempted to be performed. Policy adherence information 603 may indicate whether a policy for performing the task was adhered to. Personnel 610 may indicate personnel who performed the task or attempted to perform the task. Options selected 612 may indicate options for performing the task that were selected by the personnel performing the task. Maintenance device 614 may indicate a maintenance device that was used to perform the task.

Task completion information 604 may include more detailed information regarding a completed task or a task that was not completed for some reason. For example, without limitation, task completion information 604 may indicate task completed 605 or task not completed 606. Task not completed 606 may indicate that a task identified in a task script was not completed for some reason. When task not completed 606 is indicated, reason 607 why the task was not completed may be indicated. For example, without limitation, reason 607 may indicate that the task script was determined not to be authentic, may indicate a rule for performing the task identified in the task script that was not satisfied, or may indicate some other reason or combination of reasons why the task was not completed. Task completed 605 may indicate that the task identified by the task script was completed. When task completed 605 is indicated, task completion information 604 may indicate date completed 608, time completed 609, or other appropriate information or combinations of information regarding the task that was completed.

Report 600 may include reference to previous report 616. Reference to previous report 616 may identify the last report that was sent from an aircraft or other vehicle in any appropriate manner. For example, without limitation, reference to previous report 616 may include hash value for previous report 618. Reference to previous report 616 may be used to identify a missing report. For example, without limitation, an operator of an aircraft or other vehicle may be alerted that a report is missing when the operator receives report 600 from the aircraft or other vehicle including reference to previous report 616 that identifies a report that the operator of the aircraft or other vehicle has not received.

Report 600 may be signed with vehicle digital signature 620 to identify the source of report 600 in a known manner. For example, without limitation, vehicle digital signature 620 may comprise a digital signature for the aircraft or other vehicle on which the task referred to in report 600 is performed and report 600 is generated. Alternatively, or in addition, report 600 may be signed with system digital signature 621 identifying the system on the aircraft or other vehicle on which the task was performed. For example, without limitation, when report 600 includes both vehicle digital signature 620 and system digital signature 621, vehicle digital signature 620 may be signed over system digital signature 621.

Vehicle digital signature 620, system digital signature 621, or both, may be checked to determine whether report 600 is authentic. For example, without limitation, one or both of vehicle digital signature 620 and system digital signature 621 for report 600 may be checked to determine whether report 600 is authentic before using report 600 to create an audit log for auditing tasks performed on an aircraft or other vehicle.

Figure 7:
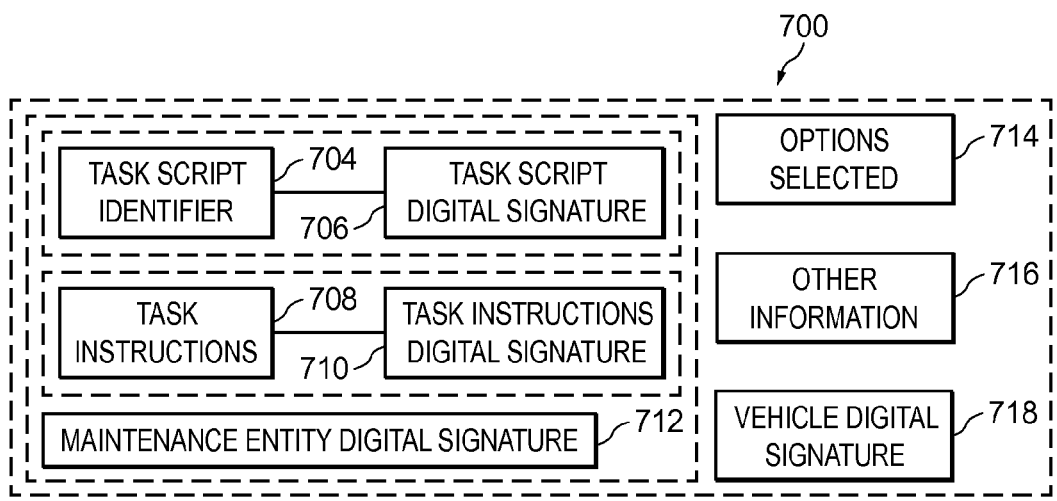
FIG. 7 is an illustration of a block diagram of a structure for a report in accordance with an illustrative embodiment.

Turning to FIG. 7, an illustration of a block diagram of a structure for a report is depicted in accordance with an illustrative embodiment. Report 700 may be an example of one implementation of a structure for report 144 in FIG. 1 and report 520 in FIG. 5.

Report 700 may include task script identifier 704 with task script digital signature 706. Task script identifier 704 may comprise any appropriate information identifying a task script and task script digital signature 706 may identify the source of the task script. For example, without limitation, task script digital signature 706 may identify a manufacturer of an aircraft or other vehicle as the source of the task script.

Report 700 also may include task instructions 708 with task instructions digital signature 710. Task instructions digital signature 710 may identify the source of task instructions 708. For example, without limitation, task instructions digital signature 710 may identify an operator of an aircraft or other vehicle as the source of task instructions 708.

Task script identifier 704 with task script digital signature 706 and task instructions 708 with task instructions digital signature 710 may be signed with maintenance entity digital signature 712. Maintenance entity digital signature 712 may identify a maintenance entity that performs a task identified by task script identifier 704 and task instructions 708 on a system on an aircraft or other vehicle. For example, without limitation, maintenance entity digital signature 712 may include a personnel digital signature identifying personnel performing the task, a device digital signature identifying a maintenance device for performing the task, or both.

Options selected 714, other information 716, or various combinations of information, may be included with the information signed with maintenance entity digital signature 712 in report 702. Options selected 714 may indicate options for performing the task identified by task script identifier 704 and task instructions 708 that were selected by personnel performing the task. Other information 716 may include other appropriate information regarding the task performed on the system on the aircraft or other vehicle.

All of the information in report 702 may be signed with vehicle digital signature 718 identifying the aircraft or other vehicle on which the task identified by task script identifier 704 and task instructions 708 is performed as the source of report 700. Alternatively, or in addition, report 702 may be signed with a system digital signature identifying the system on the aircraft or other vehicle on which the task was performed.

Figure 8:
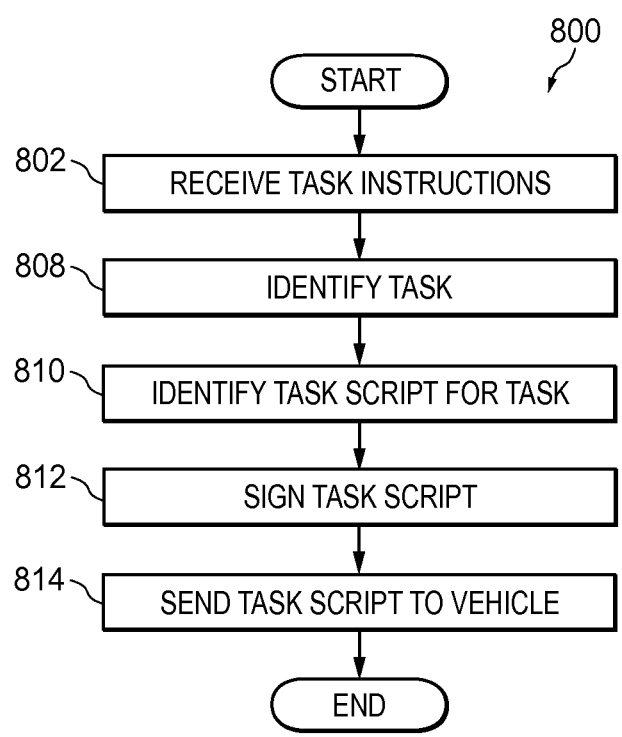
FIG. 8 is an illustration of a flowchart of a process for performing a task on a system on a vehicle by a maintenance entity in accordance with an illustrative embodiment.

Turning to FIG. 8, an illustration of a flowchart of a process for performing a task on a system on a vehicle by a maintenance entity is depicted in accordance with an illustrative embodiment. For example, without limitation, process 800 may be performed by maintenance entity 114 using maintenance device 118 to perform a task on systems 104 on aircraft 102 in FIG. 1.

Process 800 may begin with receiving task instructions by the maintenance entity (operation 802). The task instructions may indicate a task to be performed on a system on a vehicle. For example, without limitation, the task instructions may be provided by an operator of the vehicle. For example, without limitation, the task instructions may be signed with a task instructions digital signature identifying the source of the task instructions. In this case, the task instructions digital signature may be checked in a known manner to determine whether the task instructions are authentic before proceeding with process 800. Process 800 may terminate in response to a determination that the task instructions received by the maintenance entity are not authentic.

The task to be performed on the system on the vehicle may be identified from the task instructions received by the maintenance entity (operation 808). A task script for the task to be performed is identified (operation 810). The task script identifies task steps for performing the task on the system on the vehicle. For example, the task script for the task to be performed may be identified in an electronic task manual. Operation 810 may include copying the task script for the task to be performed from the electronic task manual.

The task script then may be signed with a digital signature identifying the maintenance entity performing the task on the system on the vehicle (operation 812). For example, operation 812 may include signing the task script with a personnel digital signature identifying personnel performing the task, signing the task script with a device digital signature identifying a maintenance device for performing the task, or both. The task script with the digital signature then may be sent to a vehicle on which the task identified by the task script is to be performed (operation 814), with the process terminating thereafter. The task script may be sent to the vehicle in any appropriate manner.

Figure 9:
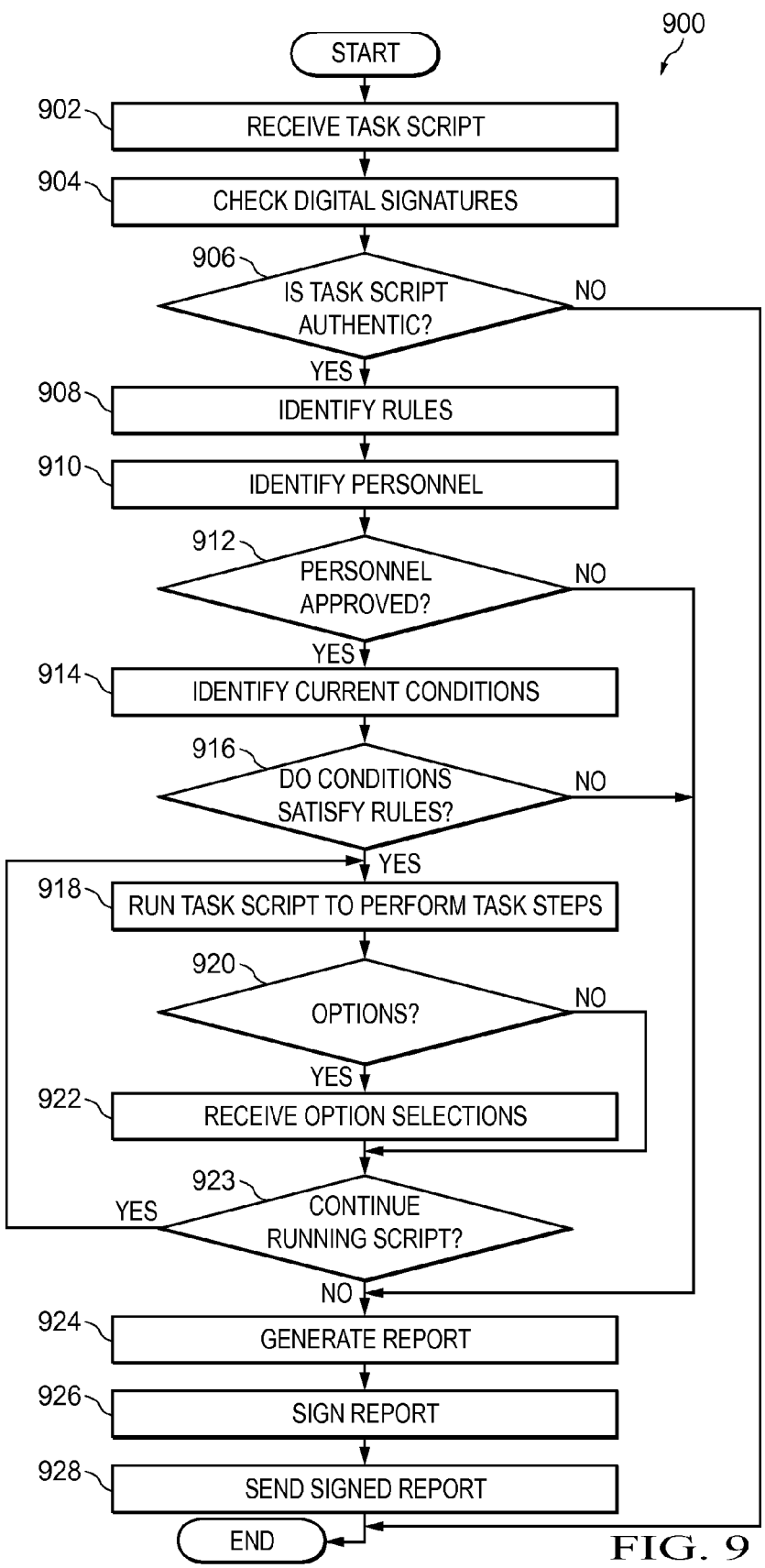
FIG. 9 is an illustration of a flowchart of a process for performing a task on a system on a vehicle in accordance with an illustrative embodiment.

Turning to FIG. 9, an illustration of a flowchart of a process for performing a task on a system on a vehicle is depicted in accordance with an illustrative embodiment. For example, without limitation, process 900 may be implemented in task script processor 140 in FIG. 1 or in task script processor 500 in FIG. 5.

Process 900 may begin with receiving a task script (operation 902). The task script may identify task steps for performing the task on the system on the vehicle and may be signed with a number of digital signatures. For example, without limitation, the task script may be signed with a task script digital signature identifying the source of the task script, a maintenance entity digital signature identifying a maintenance entity performing the task on the system on the vehicle, a personnel digital signature identifying personnel performing the task on the system, and a device digital signature identifying a maintenance device for performing the task. One or more of the digital signatures received with the task script may be checked in a known manner (operation 904) to determine whether the task script is authentic (operation 906). For example, without limitation, the task script may be determined not to be authentic when the task script is signed with a digital signature having a digital certificate that is not an approved digital certificate. Process 900 may terminate in response to a determination at operation 906 that the task script is not authentic.

In response to a determination at operation 906 that the task script is authentic, rules for performing the task identified in the task script may be identified (operation 908). For example, without limitation, rules for performing the task identified in the task script may be identified in the task script, in a policy that is separate from the task script, or both. For example, without limitation, rules identified in the task script may be provided by a manufacturer of the vehicle and rules identified in the policy may be provided by an operator of the vehicle.

For example, without limitation, the rules for performing the task as identified in a policy may indicate personnel that are allowed to perform the task. Personnel who are actually attempting to perform the task may be identified (operation 910). For example, without limitation, personnel who are actually attempting to perform the task identified in the task script may be identified from the personnel digital signature for the task script or in any other appropriate manner. It then may be determined whether the identified personnel is approved to perform the task (operation 912).

For example, without limitation, the rules for performing the task identified in the task script may indicate various conditions that must be satisfied before performing the task. When it is determined in operation 912 that the identified personnel are approved to perform the task, current conditions may be identified (operation 914). For example, without limitation, current conditions may be identified using various systems and sensors on the vehicle to identify various conditions on the vehicle or in any other appropriate manner. It then may be determined whether the current conditions satisfy the conditions for performing the task as identified in the rules (operation 916).

It also may be determined whether other rules for performing the task identified in the task script are satisfied. As another possible example, without limitation, the rules for performing the task identified in the task script may indicate maintenance devices that are allowed to be used to perform the task. In this case, a maintenance device that is being used to perform the task may be identified from the device digital signature for the task script or in any other appropriate manner. It then may be determined whether the identified maintenance device is approved to perform the task.

In response to a determination that current conditions do satisfy the rules for performing the task, the task script may be run to perform the task steps identified in the task script (operation 918). It may be determined whether options for any of the task steps are identified in the task script (operation 920). When options are identified in the task script, option selections may be received from the personnel performing the task (operation 922). For example, without limitation, operation 922 may include displaying various options to personnel and receiving option selections from among the displayed options by the personnel via an appropriate user interface. When no options are identified in the task script, operation 922 may be skipped.

It may be determined if the task script is to continue running (operation 923). For example, it may be determined at operation 923 that the task script is to continue running as long as there are task steps in the task script that have not yet been performed. Process 900 may return to operation 918 in response to a determination at operation 923 that the task script is to continue running.

In response to a determination at operation 923 that the running of the task script is complete, a report may be generated (operation 924). The report may include information regarding the task performed on the system on the vehicle in any appropriate form. For example, without limitation, the report may indicate the task performed on the system, personnel performing the task, options selected for performing the task, a maintenance device used for performing the task, other appropriate information, or various combinations of information regarding the task performed on the system on the vehicle.

The report may be signed with a digital signature in a known manner (operation 926). For example, without limitation, the report may be signed with a vehicle digital signature identifying the vehicle on which the task was performed, a system digital signature identifying the system on which the task was performed, or both. The signed report then may be sent to an appropriate location (operation 928), with the process terminating thereafter. The report may be used to create an audit log for auditing tasks performed on the vehicle or for any other appropriate purpose or various combinations of purposes. The digital signature for the report may be checked to determine whether the report is authentic before using the report for any such purpose.

Returning to operation 912, in response to a determination that the personnel attempting to perform the task are not approved, process 900 may proceed to operation 924. In this case, the report generated in operation 924 may indicate that the task was not performed because the personnel attempting to perform the task were not approved to do so.

Returning to operation 916, in response to a determination that the current conditions do not satisfy the conditions identified in the rules for performing the task, process 900 may proceed to operation 924. In this case, the report generated in operation 924 may indicate the rule that prevented the task from being performed.

Returning to operation 906, instead of terminating process 900 in response to a determination that the task script is not authentic, process 900 may proceed to operation 924. In this case, the report generated in operation 924 may indicate that the task was not performed because the task script was determined not to be authentic.

Alternatively, or in addition, personnel performing the task may be notified when the task identified in the task script cannot be performed for some reason. In this case, the personnel may take appropriate corrective action so that the task script may be run.

Turning to FIG. 10, an illustration of a block diagram of a data processing system is depicted in accordance with an illustrative embodiment. Data processing system 1000 may be an example of one implementation of aircraft network data processing system 106 on aircraft 102 in FIG. 1. Data processing system 1000 also may be an example of one implementation of maintenance device 118 in FIG. 1.

In this illustrative example, data processing system 1000 includes communications fabric 1002. Communications fabric 1002 provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program instructions, program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, communications unit 1010 may include a number of devices that transmit data, receive data, or transmit and receive data. Communications unit 1010 may be, for example, a modem or a network adapter, two network adapters, or some combination thereof. Further, a memory may be, for example, memory 1006, or a cache, such as found in an interface and memory controller hub that may be present in communications fabric 1002.

Illustrative embodiments provide an electronic task manual for an aircraft or other vehicle in which maintenance and diagnostic actions to be performed on the aircraft or other vehicle are encoded in computer executable form. Illustrative embodiments capture a complete audit trail that comprises a secure record of the tasks performed on the aircraft or other vehicle and under what authorization. Illustrative embodiments also provide an operator of the aircraft or other vehicle the ability to specify policies for performing certain tasks on the aircraft or other vehicle and the aircraft or other vehicle may rigorously verify that these policies are adhered to.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of performing a task on a system on a platform, comprising:
   receiving a task script, by a data processing system on the platform, wherein the task script identifies task steps for performing the task on the system and identifies rules for performing the task on the system including preconditions for performing the task on the system;
   checking a digital signature for the task script by the data processing system to determine whether the task script is authentic;
   determining, by the data processing system, whether the rules for performing the task on the system are satisfied; and
   running the task script in response to a determination that the task script is authentic and that the rules for performing the task on the system are satisfied, by the data processing system, to perform the task on the system.

2. The method of claim 1 further comprising:
   determining, by the data processing system, whether a policy for performing the task is satisfied; and
   running the task script to perform the task in response to a determination that the policy is satisfied.

3. The method of claim 1 wherein the digital signature is selected from:
   a task script digital signature identifying a source of the task script;
   a maintenance entity digital signature identifying a maintenance entity performing the task on the system;
   a personnel digital signature identifying personnel performing the task on the system; and
   a device digital signature identifying a maintenance device for performing the task on the system.

4. The method of claim 1 further comprising:
   generating a report, by the data processing system, wherein the report indicates the task performed on the system;
   signing the report, by the data processing system, with a digital signature for the platform; and
   sending the report with the digital signature for the platform off of the platform, by the data processing system.

5. The method of claim 4 further comprising a selected one of:
   identifying, by the data processing system, personnel performing the task on the system and wherein generating the report comprises indicating the personnel in the report; and
   identifying, by the data processing system, a maintenance device used for performing the task on the system and wherein generating the report comprises indicating the maintenance device in the report.

6. The method of claim 4 further comprising:
   identifying, by the data processing system, options for performing the task;
   receiving option selections, by the data processing system, wherein the option selections identify options selected from the options for performing the task; and
   wherein generating the report comprises indicating the options selected in the report.

7. The method of claim 4 further comprising:
   signing the report with a system digital signature identifying the system.

8. The method of claim 1, wherein:
   the platform is an aircraft;
   the data processing system is an aircraft network data processing system on the aircraft;
   receiving the task script comprises receiving the task script on the aircraft when the aircraft is on the ground; and further comprising:
   removing the task script from the aircraft before the aircraft is in flight following receiving the task script on the aircraft and performing the task on the aircraft.

9. An apparatus on a platform, comprising:
   a receiver configured to receive a task script, wherein the task script identifies task steps for performing a task on a system on the platform and identifies rules for performing the task on the system including preconditions for performing the task on the system;
   a digital signature checker configured to check a digital signature for the task script to determine whether the task script is authentic;
   a rules checker configured to determine whether the rules for performing the task on the system are satisfied; and
   a task executer configured to run the task script in response to a determination that the task script is authentic and that the rules for performing the task on the system are satisfied to perform the task on the system.

10. The apparatus of claim 9 wherein:
    the rules checker is configured to determine whether a policy for performing the task is satisfied; and
    wherein the task executer is configured to run the task script to perform the task in response to a determination that the policy is satisfied.

11. The apparatus of claim 9 wherein the digital signature is selected from:
    a task script digital signature identifying a source of the task script;
    a maintenance entity digital signature identifying a maintenance entity performing the task on the system;
    a personnel digital signature identifying personnel performing the task on the system; and
    a device digital signature identifying a maintenance device for performing the task on the system.

12. The apparatus of claim 9 further comprising:
    a report generator configured to generate a report indicating the task performed on the system;
    a signer configured to sign the report with a digital signature for the platform; and
    a sender configured to send the report with the digital signature for the platform off of the platform.

13. The apparatus of claim 12 further comprising:
    a personnel identifier configured to identify personnel performing the task on the system; and
    wherein the report generator is configured to indicate the personnel and a maintenance device used for performing the task in the report.

14. The apparatus of claim 12 further comprising:
    an options selector configured to receive option selections identifying options selected from options for performing the task; and
    wherein the report generator is configured to indicate the options selected in the report.

15. The apparatus of claim 12, wherein the signer is configured to sign the report with a system digital signature identifying the system.

16. The apparatus of claim 9, wherein:
    the platform is an aircraft;
    the receiver is configured to receive the task script on the aircraft when the aircraft is on the ground; and further comprising:

a task script remover configured to remove the task script from the aircraft before the aircraft is in flight following receiving the task script on the aircraft and performing the task on the aircraft.

17. A method of performing a task on a system on a platform, comprising:
- signing a task script, by a processor unit, with a digital signature, wherein the processor unit is selected from (1) a processor unit in a portable maintenance device configured to be moved to the platform and (2) a processor unit in a remote console in communication with the platform;
- sending the task script with a digital signature to the platform, by the processor unit;
- receiving task instructions, by the processor unit, wherein the task instructions identify the task to be performed on the system on the platform;
- identifying the task script for the task, by the processor unit, in response to receiving the task instructions, wherein the task script is machine executable and identifies task steps for performing the task on the system and identifies rules for performing the task on the system including preconditions for performing the task on the system; and
- running the task script in response to a determination that the task script is authentic and that the rules for performing the task on the system are satisfied to perform the task on the system.

18. The method of claim 17, wherein: the platform is an aircraft.

19. The method of claim 1, wherein the platform comprises a building, an oil rig, or a vehicle.

\* \* \* \* \*